(12) United States Patent
Kim et al.

(10) Patent No.: US 12,556,070 B2
(45) Date of Patent: Feb. 17, 2026

(54) ELECTRIC MOTOR DRIVE DEVICE

(71) Applicant: LS ELECTRIC CO., LTD., Anyang-si (KR)

(72) Inventors: Dong Sik Kim, Anyang-si (KR); Chun Suk Yang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 266 days.

(21) Appl. No.: 18/282,964

(22) PCT Filed: Nov. 25, 2021

(86) PCT No.: PCT/KR2021/017491
§ 371 (c)(1),
(2) Date: Sep. 19, 2023

(87) PCT Pub. No.: WO2022/203156
PCT Pub. Date: Sep. 29, 2022

(65) Prior Publication Data
US 2024/0171047 A1 May 23, 2024

(30) Foreign Application Priority Data
Mar. 25, 2021 (KR) .................. 10-2021-0039165

(51) Int. Cl.
*H02K 11/33* (2016.01)
*H05K 1/14* (2006.01)

(52) U.S. Cl.
CPC ............ *H02K 11/33* (2016.01); *H05K 1/144* (2013.01); *H02K 2211/03* (2013.01)

(58) Field of Classification Search
CPC ..... H02K 11/33; H02K 2211/03; H05K 1/144
USPC ........................................................ 361/784
See application file for complete search history.

(56) References Cited

FOREIGN PATENT DOCUMENTS

| JP | 6339988 U | 3/1988 |
|---|---|---|
| JP | 08009653 A | 1/1996 |
| JP | 10075030 A | 3/1998 |
| JP | 2019195253 A | 11/2019 |
| KR | 20020047878 A | 6/2002 |

OTHER PUBLICATIONS

Kanazawa et al. (WO 2020/162530), Aug. 13, 2020 (Year: 2020).*

* cited by examiner

*Primary Examiner* — Tremesha W Burns
(74) *Attorney, Agent, or Firm* — K&L Gates LLP

(57) ABSTRACT

An electric motor drive device is provided. The electric motor drive device according to an embodiment of the present disclosure to which an operation module is connected, may comprise: a first case having a first surface formed therein; a second case having an inner accommodation space formed therein and having an outer portion to which the operation module is coupled; a first circuit board disposed at the first surface and having a first connector at one side thereof, a second circuit board disposed within the second case and having a second connector; and a first fixing member formed to protrude from the first surface.

13 Claims, 12 Drawing Sheets

ELECTRIC MOTOR DRIVE DEVICE

CROSS-REFERENCE TO RELATED APPLICATION

This application is a National Stage of International Application No. PCT/KR2021/017491, filed on Nov. 25, 2021, which claims priority to and the benefit of Korean Patent Application No. 10-2021-0039165, filed on Mar. 25, 2021, the disclosure of which is incorporated herein by reference in its entirety.

FIELD

The present disclosure relates to an electric motor drive device, and more specifically to an electric motor drive device that can be easily assembled without a separate coupling configuration.

BACKGROUND

In general, the electric motor drive device refers to a series of devices that control the speed of a motor with high efficiency by receiving the power supplied from a used power source and supplying the same to the motor by varying the voltage and frequency within itself.

Demand for such an electric motor drive device is continuously increasing worldwide as a measure to save energy and improve the efficiency of energy use. According to this trend, preference for a more compact electric motor drive device with improved performance compared to the related art is increasing.

Typically, in a conventional electric motor drive device, a case forms an overall appearance, and a circuit unit for driving is accommodated in an inner space formed by the case.

The circuit unit includes a plurality of main circuit boards such as a power board, a filter board, a control board and/or a cap board, and the plurality of circuit boards are interconnected with a conductor such as a wire or a clamp structure for mutual electrical signal connection, and alternatively, they are interconnected by a cable composed of wires and connectors.

However, such a complicated conventional board connection structure not only increases the working time for assembling the electric motor drive device, but also has a problem in that it is difficult to implement the automation of an assembly required for the automated process. Furthermore, there is a problem in that the wire or cable generates a noise signal like an antenna inside the electric motor drive device.

Therefore, there have been attempts to remove wires or cables in the related art. For example, Korean Registered Patent Publication No. 10-2213128 adopts a structure in which some circuit boards are vertically arranged with other circuit boards to remove wires or cables, and are connected with connectors.

In this way, when some circuit boards and other circuit boards are connected only with connectors, the disadvantages caused by wires or cables can be overcome, but in a vibration or shock environment, vertically arranged circuit boards cannot be firmly coupled, and thus, there has been a problem in that it results in the deterioration of operating quality.

SUMMARY

An object of the present disclosure is to provide an electric motor drive device in which vertically arranged circuit boards can be firmly fixed in a case even in a vibration or impact environment.

In addition, another object of the present disclosure is to provide an electric motor drive device in which vertically arranged circuit boards can be easily coupled to a case without an assembly screw for separate coupling.

In addition, still another object of the present disclosure is to provide an electric motor drive device in which a plurality of circuit boards that are arranged in parallel do not sag in the process of coupling the vertically arranged circuit boards.

The problems of the present disclosure are not limited to the above-mentioned problems, and other problems that are not mentioned will be clearly understood by those skilled in the art from the following description.

In order to solve the above problems, the electric motor drive device according to an aspect of the present disclosure, to which an operation module is connected, may include a first case having a first surface formed therein; a second case having an inner accommodation space formed therein and having an outer portion to which the operation module is coupled; a first circuit board disposed on the first surface and having a first connector at one side thereof; a second circuit board disposed within the second case and having a second connector; and a first fixing member formed to protrude from the first surface such that one side of the second circuit board is fitted and coupled thereto in a perpendicular state to the first circuit board.

In this case, the first fixing member may include a pair of first support ends that protrude from the first surface and are disposed to be spaced apart from each other at a predetermined interval; and a pair of first fixing protrusions that respectively protrude from inner ends of the pair of first support ends, and one side of the second circuit board may be elastically supported by the pair of first support ends in a state of being fitted and coupled between the pair of first fixing protrusions.

In this case, a first guide surface may be formed on the pair of first fixing protrusions to guide one side of the second circuit board between the pair of first fixing protrusions.

In this case, the electric motor drive device may further include at least one second fixing member which is formed to protrude from a second surface that is formed to face the first surface inside the second case such that the other side of the second circuit board is fitted and coupled thereto, wherein the second fixing member may include a pair of second support ends that protrude from the second surface and are disposed to be spaced apart from each other at a predetermined interval; and a pair of second fixing protrusions that respectively protrude from inner ends of the pair of second support ends, and wherein the other side of the second circuit board may be elastically supported by the pair of second support ends in a state of being fitted and coupled between the pair of second fixing protrusions.

In this case, a second guide surface may be formed on the pair of second fixing protrusions to guide the other side of the second circuit board between the pair of second fixing protrusions.

In this case, the electric motor drive device may further include a third circuit board which is disposed to be spaced apart from the first circuit board at a predetermined interval and is provided with a third connector on one side thereof, wherein the second circuit board may be further provided with a fourth connector that is electrically connected to the third connector, wherein the first connector, the second connector, the third connector and the fourth connector may be formed to be coupled by pressing in a direction perpendicular to the first surface, and wherein the electric motor drive device may further include a support member which is disposed to face the third connector with the third circuit board interposed therebetween to support the third circuit board when the fourth connector is coupled to the third connector.

In this case, the first circuit board may be provided with a groove part which is formed at a position corresponding to a position of the third connector on the third circuit board, and the support member may include a body which is fitted and coupled to the groove part; at least one support part which protrudes from one surface of the body such that a front end surface thereof supports the third circuit board; and a plurality of fixing parts which protrude from a side surface of the body so as to support both surfaces of an edge portion of the groove part.

In this case, the support member may further include a plurality of protrusions that are formed to protrude from a side surface of the body, and a plurality of seating grooves in which the plurality of protrusions are seated may be formed on the inner circumferential surface of the groove part so as to prevent the body from being separated from the groove part.

In this case, a support guide surface may be formed on the plurality of fixing parts so as to guide the edge portion between the plurality of fixing parts.

In this case, the second circuit board may include a plurality of protrusions that are formed to protrude from the other side; and a fifth connector which is disposed on any one of the plurality of protrusions, wherein the second case may be provided with a plurality of first through-holes which are formed to extend on an inner surface of the second case facing the first surface such that the plurality of protrusions pass through the second case and are disposed outside the second case, and wherein the operation module may include a housing which is coupled to a lower surface of the first surface and is provided with a plurality of second through-holes that are formed at positions corresponding to the plurality of first through-holes; a cover which is coupled to the housing to form an inner space; a fourth circuit board which is disposed in the inner space; and a sixth connector which is provided on one side of the fourth circuit board and electrically coupled to the fifth connector as the housing is coupled to the second case.

In this case, first through-hole guide surfaces may be formed at both ends of the through-hole in the longitudinal direction such that the protrusion is guided to the through-hole.

In this case, the electric motor drive device may further include at least one pressing member which elastically presses a front end surface of the protrusion such that the second circuit board is pressed toward the first surface.

In this case, the pressing member may be disposed to face the second connector or the fourth connector with the second circuit board interposed therebetween.

In this case, the pressing member may include a support which protrudes from the housing toward the inner space; an elastic band which protrudes from a side surface of the support toward the second through-hole; and a pressing protrusion which presses the front end surface of the protrusion from the elastic band.

Since the electric motor drive device according to an exemplary embodiment of the present disclosure is provided with a first fixing member and a second fixing member, the vertically arranged circuit boards can be firmly fixed inside a case even in a vibration or impact environment.

In addition, since the electric motor drive device according to an exemplary embodiment of the present disclosure is further provided with a pressing member, the vertically arranged circuit boards can be easily coupled to the case without an assembly screw for separate coupling.

Since the electric motor drive device according to an exemplary embodiment of the present disclosure is provided with a support member, it is possible to prevent a plurality of circuit boards that are arranged in parallel from sagging in the process of coupling the vertically arranged circuit boards.

It should be understood that the effects of the present disclosure are not limited to the above-described effects, and include all effects that can be inferred from the configuration of the disclosure described in the description or claims of the present disclosure.

BRIEF DESCRIPTION OF THE DRAWINGS

FIG. 8 (b) is a perspective view of the support member of the electric motor drive device according to an exemplary embodiment of the present disclosure viewed from the other side. FIG. 8 (c) is a side view of the support member of the electric motor drive device according to an exemplary embodiment of the present disclosure.

FIG. 9 (b) is an enlarged view showing a state in which the support member of the electric motor drive device according to an exemplary embodiment of the present disclosure is coupled to the first circuit board.

DETAILED DESCRIPTION

Figure 1:
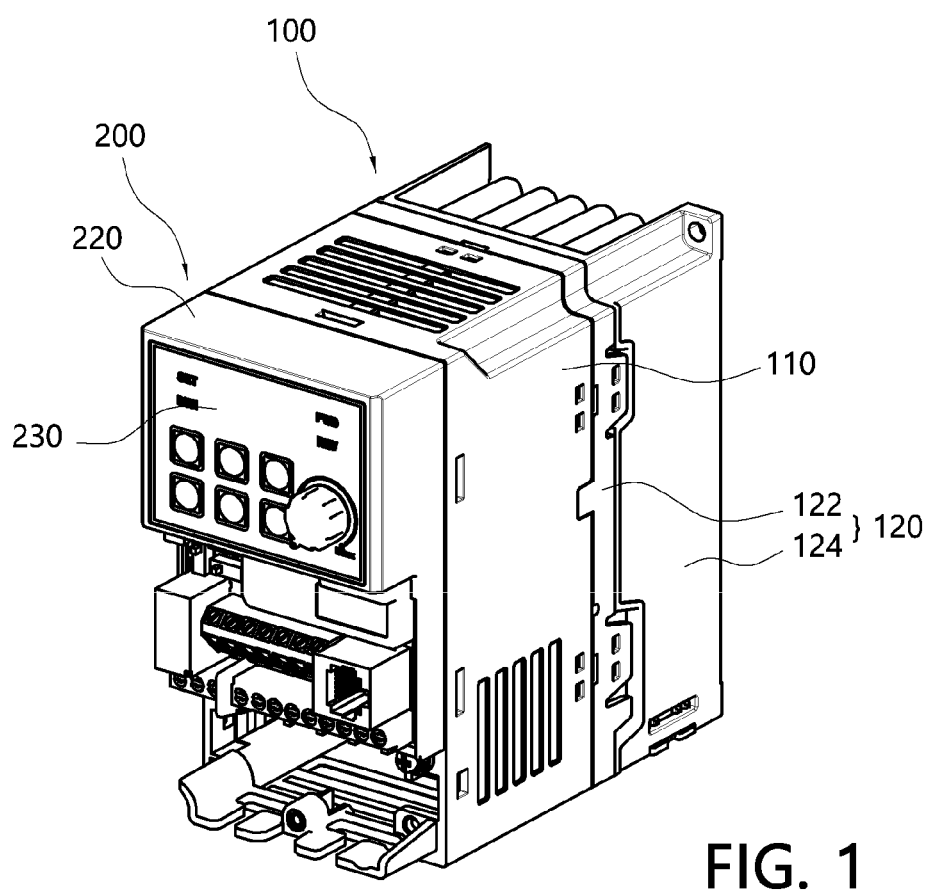
FIG. 1 is a perspective view of an electric motor drive device according to an exemplary embodiment of the present disclosure.

Hereinafter, with reference to the accompanying drawings, the exemplary embodiments of the present disclosure will be described in detail so that those of ordinary skill in the art to which the present disclosure pertains can easily practice the present disclosure. The present disclosure may be embodied in many different forms and is not limited to the exemplary embodiments described herein. Unless otherwise defined, terms used in the exemplary embodiments of the present disclosure may be interpreted as meanings commonly known to those of ordinary skill in the art. Hereinafter, the expression "connection" includes not only being directly connected, but also being connected indirectly through another configuration.

Terms such as 'first' and 'second' may be used to describe various components, but the components should not be limited by the above terms. The above terms may be used only for the purpose of distinguishing one component from another. For example, without departing from the scope of the present disclosure, a 'first component' may be termed a 'second component', and similarly, a 'second component' may also be termed a 'first component.'

In order to clearly describe the present disclosure in the drawings, parts that are irrelevant to the description are omitted, and the same reference numerals are assigned to the same or similar components throughout the specification.

The present disclosure provides an electric motor drive device in which vertically arranged circuit boards can be firmly fixed to the inside of a case without am assembly screw for separate coupling even in a vibration or impact environment. In particular, when a plurality of circuit boards are arranged in parallel, provided is an electric motor drive device which is provided with a support member to prevent sagging from occurring in the process of coupling the plurality of circuit boards that are arranged in parallel with the vertically arranged circuit boards.

Figure 2:
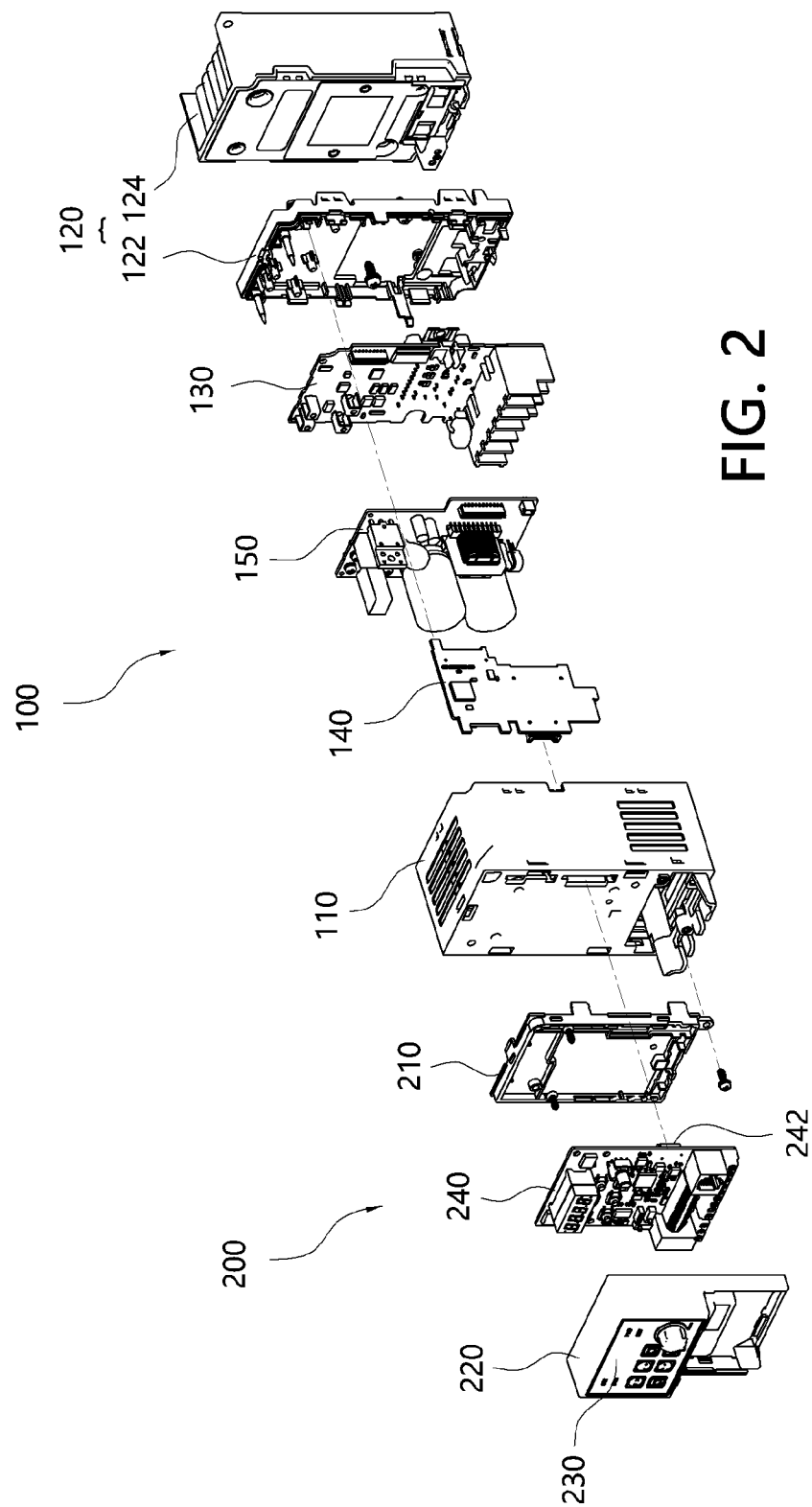
FIG. 2 is an exploded perspective view of an electric motor drive device according to an exemplary embodiment of the present disclosure.

FIG. 1 is a perspective view of an electric motor drive device according to an exemplary embodiment of the present disclosure. FIG. 2 is an exploded perspective view of an electric motor drive device according to an exemplary embodiment of the present disclosure. Hereinafter, it will be described by defining a direction toward the top of the electric motor drive device shown in FIG. 1 as an upward direction, and defining a direction in which the operation module is coupled as a front side.

As illustrated in FIG. 1, the electric motor drive device according to an exemplary embodiment of the present disclosure is provided with a first case 120 and a second case 110, and as illustrated in FIG. 2, the electric motor drive device according to an exemplary embodiment of the present disclosure is provided with a first circuit board 130 and a second circuit board in an accommodation space formed by the first case 120 and the second case 110.

As illustrated in FIG. 1, the first case 120 may include a frame 122 on which a first surface 125 is formed in the front side and a heat dissipation part 124.

In this case, on the first surface 125 of the frame 122, a first circuit board 130, which will be described below, may be disposed to be spaced apart from the first surface 125 to be parallel therewith.

The heat dissipation part 124 may be disposed on the rear surface of the frame 122, that is, on the rear surface of the first surface 125. The heat dissipation part 124 absorbs heat generated from the first circuit board 130 and the second circuit board 140 to be described below and radiates the heat to the outside.

At least one fan may be disposed on one side of the heat dissipation part 124. The fan continuously supplies external air toward the heat dissipation part 124. Through this, the heat transferred to the heat dissipation part 124 may be effectively dissipated to the outside.

As illustrated in FIG. 2, the heat dissipation part 124 may be formed to be detachable from the frame 122, but the present disclosure is not limited thereto, and it may be integrally formed by injection molding.

A second case 110 for closing the first surface 125 is disposed in front of the first surface 125 of the first case 120.

The second case 110 is formed in a box shape with an open rear surface such that an inner accommodating space that is partitioned from the outside is formed between the first case 120 and the second case 110, but if an inner space can be formed, there is no limitation on the shape.

As illustrated in FIG. 2, a first circuit board 130 and a second circuit board 140 to be described below are accommodated in the inner space. In addition, a plurality of slits may be formed on a side surface of the second case 110. Accordingly, the heat generated from the first circuit board 130 and the second circuit board 140 together with the heat dissipation part 124 may be radiated to the outside.

Meanwhile, a second surface 111 which is opposite to the first surface 125 is formed on the inner front side of the second case 110. A plurality of first through-holes 112 through which the accommodating space inside the second case 110 and the outside can be penetrated may be formed on the second surface 111.

As illustrated in FIG. 2, at least two or more circuit boards may be included in the accommodating space formed by the first case 120 and the second case 110, as necessary.

In this case, the first circuit board 130 is accommodated in a fixed state on the first surface 125 of the first case 120. The first circuit board 130 is not limited in the manner in which it is fixed to the first surface 125, and various known parts or structures may be applied. For example, a cone-shaped pillar 123 that is fixed by screwing or protrudes from the first surface 125 may penetrate and support the first circuit board 130.

Figure 3:
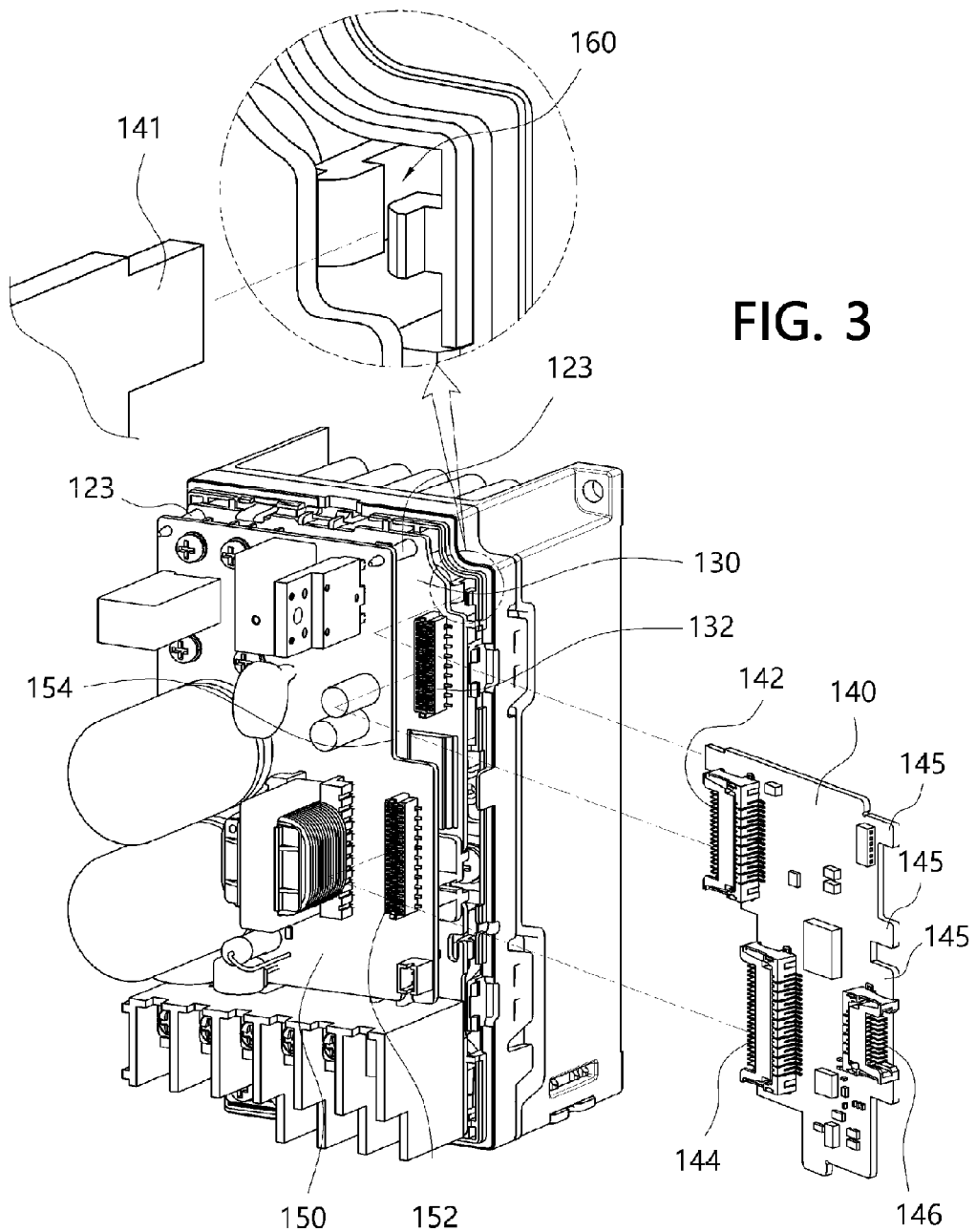
FIG. 3 is an enlarged view showing a first fixing member of the electric motor drive device according to an exemplary embodiment of the present disclosure.
Figure 4:
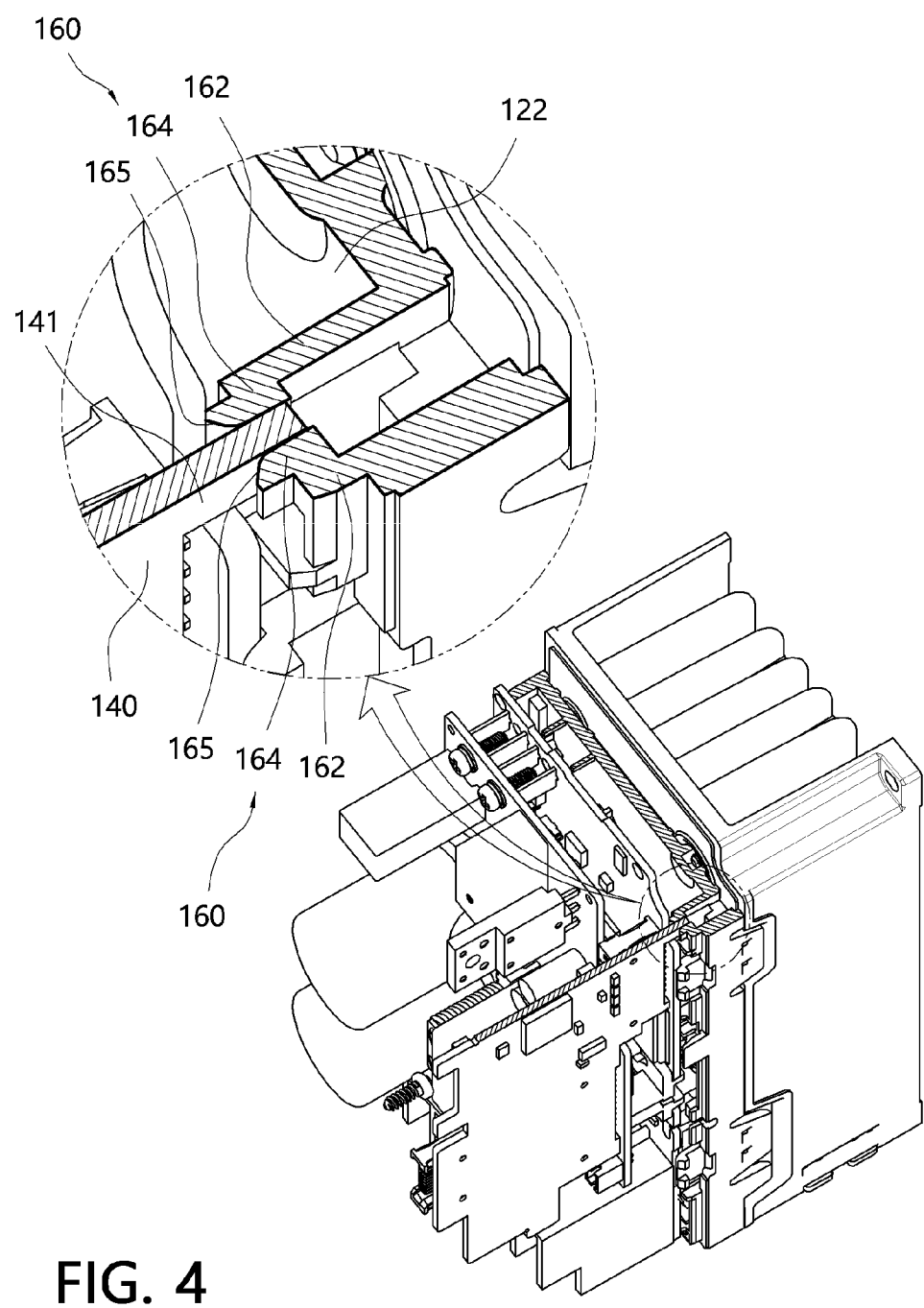
FIG. 4 is a view showing a state in which the second circuit board is coupled to the first fixing member of the electric motor drive device according to an exemplary embodiment of the present disclosure.

FIG. 3 is an enlarged view showing a first fixing member of the electric motor drive device according to an exemplary embodiment of the present disclosure. FIG. 4 is a view showing a state in which the second circuit board is coupled to the first fixing member of the electric motor drive device according to an exemplary embodiment of the present disclosure.

As illustrated in FIG. 3, a first connector 132 is provided on one side of the first circuit board 130 of the electric motor drive device 100 according to an exemplary embodiment of the present disclosure. The first circuit board 130 is electrically connected to another circuit board through the first connector 132. The first connector 132 is formed such that another connector can be connected in a direction perpendicular to the first surface 125.

In this case, the first circuit board 130 may include a power circuit. The power circuit may use a power semiconductor device to have a function of generating a variable voltage and variable frequency for driving a motor, a DC-link smoothing function of smoothing the input voltage, and a function of detecting the DC-link voltage and the inverter output current.

In order to function as such a power circuit, an IGBT, a power relay, a gate driver IC, a Hall-CT, a DC Ractor and a snubber capacitor may be mounted as major components on the first circuit board 130.

The second circuit board 140 is disposed to be perpendicular to the first surface 125 in the accommodating space formed by the first case 120 and the second case 110.

A second connector 142 is disposed on one side of the second circuit board 140 of the electric motor drive device 100 according to an exemplary embodiment of the present disclosure. The second connector 142 is coupled to the first connector 132 such that the first circuit board 130 and the second circuit board 140 are electrically connected.

In this case, as illustrated in FIG. 3, the second connector 142 presses the second circuit board 140 in a direction perpendicular to the first surface 125 so as to couple the second connector 142 to the first connector 132.

The second circuit board 140 may include a control circuit. In this case, the control circuit may have a controller function for generating a signal (PWM) for controlling a motor by using the operation command, the speed command, and the voltage and current information.

For the function of the control circuit as described above, a micro control unit (MCU) may be mounted as a main component on the second circuit board 140.

Meanwhile, the electric motor drive device 100 according to an exemplary embodiment of the present disclosure may further include a third circuit board 150 that is electrically connected to the first circuit board 130 and the second circuit board 140.

The third circuit board 150 may be disposed to be spaced apart from the front side of the first circuit board 130 and disposed to be parallel to the first circuit board 130.

The third circuit board 150 may include a filter circuit. In this case, the filter circuit may have a filtering function of reducing noise components that are generated in the inverter.

For the function of the filter circuit, an EMC choke, an X-Capacitor, a Y-Capacitor and a transformer may be mounted as main components on the third circuit board 150.

However, as long as the first circuit board 130 to the third circuit board 150 may include other circuits as necessary, it is not limited to a specific circuit as described above.

In order for the third circuit board 150 to be fixed to the front side of the first circuit board 130, the first circuit board 130 may be fixed in the same manner as being fixed to the first case 120. Therefore, the description thereof will be omitted.

A third connector 152 may be provided on the third circuit board 150 so as to be electrically connected to the second circuit board 140, and a fourth connector 144 that is coupled to the third connector 152 may be provided on the second circuit board 140.

The third connector 152 is formed on one side of the third circuit board 150. In this case, a cutting part 154 may be formed in the third circuit board 150 such that the first connector 132 is exposed toward the front side. Accordingly, the cutting part 154 and the third connector 152 may be disposed in a straight line.

In order to correspond thereto, as illustrated in FIG. 3, the fourth connector 144 is disposed on the inside of the second circuit board 140 rather than the second connector 142 on the second circuit board 140. That is, one side portion of the second circuit board 140 is formed in a shape in which the upper side further protrudes rearward.

Accordingly, the user may press the second circuit board 140 in a direction perpendicular to the first surface 125 so as to connect the first connector 132, the second connector 142 and the third connector 152 to the fourth connector 144.

In this case, in order to be firmly fixed to the first case 120 in a state where the second circuit board 140 is connected to the first circuit board 130 and the third circuit board 150, the electric motor drive device 100 according to an exemplary embodiment of the present disclosure is provided with a first fixing member 160.

The number of the first fixing members 160 may vary depending on the structure or size of the first case 120.

The first fixing member 160 is fixed to the first case 120 by which the second connector 142 and the fourth connector 144 are fitted and coupled to the first fixing member 160, in addition to being coupled and fixed to the first connector 132 and the third connector 152.

To this end, as illustrated in FIG. 4, the first fixing member 160 of the electric motor drive device 100 according to an exemplary embodiment of the present disclosure is provided with a pair of first support ends 162 and a pair of first fixing protrusions 164.

The pair of first support ends 162 are formed to protrude forward from the first surface 125. The pair of first support ends 162 are formed to be spaced apart from each other. A rear side edge of the second circuit board 140 is disposed between the pair of first support ends 162.

In this case, as illustrated in FIG. 4, the upper side of the rear side edge of the second circuit board 140 may be coupled, but the present disclosure is not limited thereto. The coupling position may vary depending on the structure of the first case 120 or the size of the configuration disposed on the first case 120. In addition, a plurality of positions may be coupled according to the number of the first fixing members 160.

In this case, a pair of first fixing protrusions 164 that are formed to protrude toward the side between the pair of first support ends 162 are provided at the front end of the pair of first support ends 162. Accordingly, the rear side edge of the second circuit board 140 is fitted and coupled between the pair of first fixing protrusions 164.

In this case, the pair of first support ends 162 are elastically deformed such that the pair of first fixing protrusions 164 press the rear side edge of the second circuit board 140 from both sides.

Accordingly, the second circuit board 140 is coupled to the first connector 132, the third connector 152 and the first fixing member 160 while being arranged in a direction perpendicular to the first surface 125 so as to be fixed to the first case 120.

As the first fixing member 160 is formed on the first surface 125, the second circuit board 140 may be stably connected to the first circuit board 130 and the third circuit board 150 in a vibration or impact environment, even if a configuration for separate coupling, for example, a screw is not fastened.

As illustrated in FIG. 4, a first guide surface 165 is formed on the first fixing protrusion 183 of the electric motor drive device 100 according to an exemplary embodiment of the present disclosure.

The first guide surface 165 is inclined such that the rear side edge of the second circuit board 140 can be easily guided between the pair of first fixing protrusions 164.

Accordingly, even if some error occurs when an assembler or a robot combines the second circuit board 140, the rear side edge of the second circuit board 140 can be coupled to the first fixing member 160 along the first guide surface, and thus, not only the coupling operation may be facilitated, but also the assembly time may be shortened.

Meanwhile, as illustrated in FIG. 3, a coupling part 141 which protrudes backward may be formed at a position of being coupled to the first fixing member 160 among the rear side edges of the second circuit board 140.

The coupling part 141 is coupled to the first fixing member 160 before the second connector 142 and the fourth connector 144 are respectively connected to the first connector 132 and the third connector 152.

Accordingly, the assembler or robot may respectively connect the second connector 142 and the fourth connector 144 to the first connector 132 and the third connector 152 by continuously pressing backward while the coupling part 141 is fitted between the pair of first fixing protrusions 162.

That is, not only can the assembler or robot more easily grasp the position where the second circuit board 140 is fixed and easily fix the coupling part 151 to the second circuit board 140, but also the assembler or robot may easily couple the second connector 142 and the fourth connector 144 in a state of being arranged by the first fixing member 160.

In this case, a through-hole through which the coupling part 141 can penetrate may be formed on the first surface 125 of the first case 120 according to the degree to which the coupling part 141 protrudes.

Figure 5:
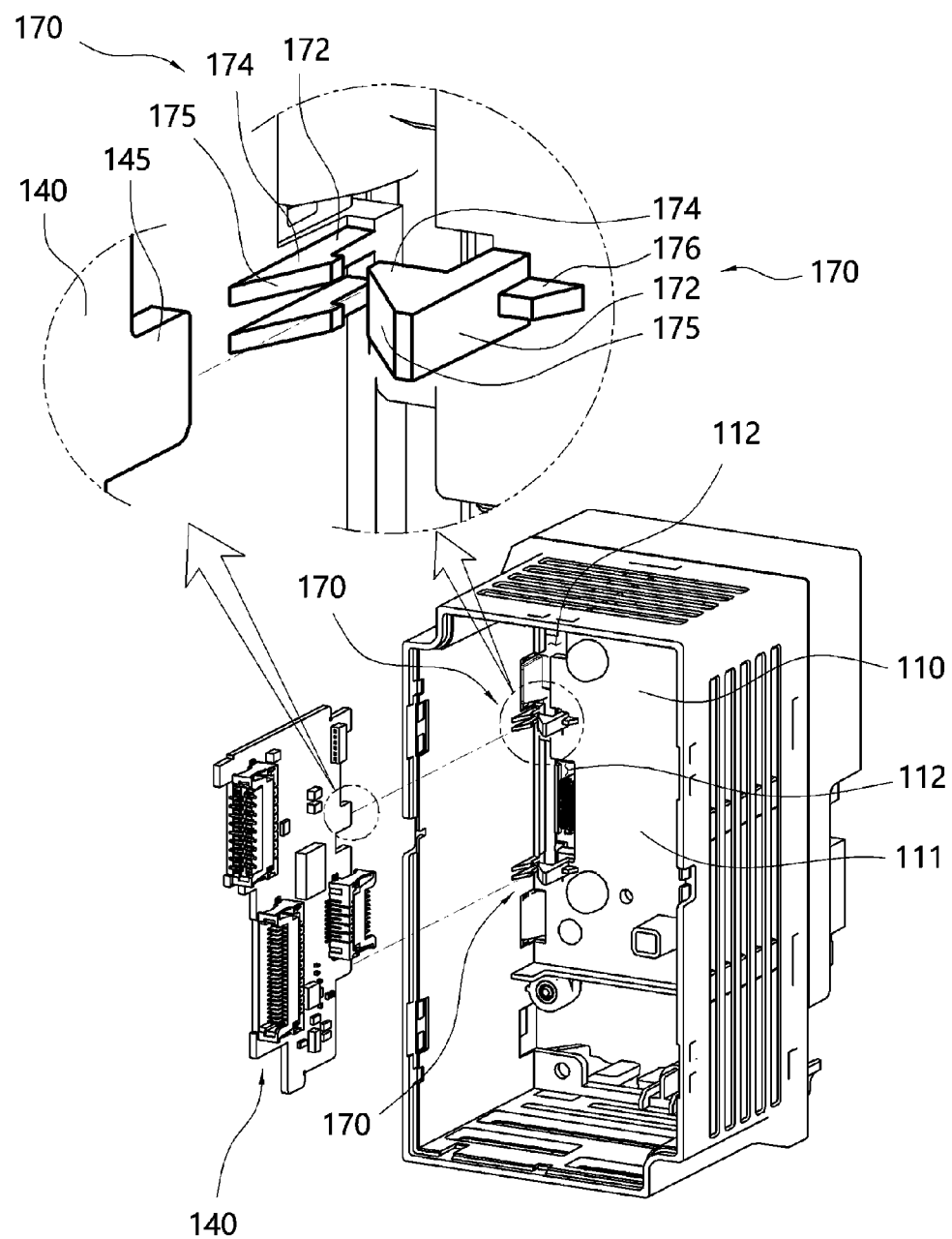
FIG. 5 is an enlarged view showing a second fixing member of the electric motor drive device according to an exemplary embodiment of the present disclosure.
Figure 6:
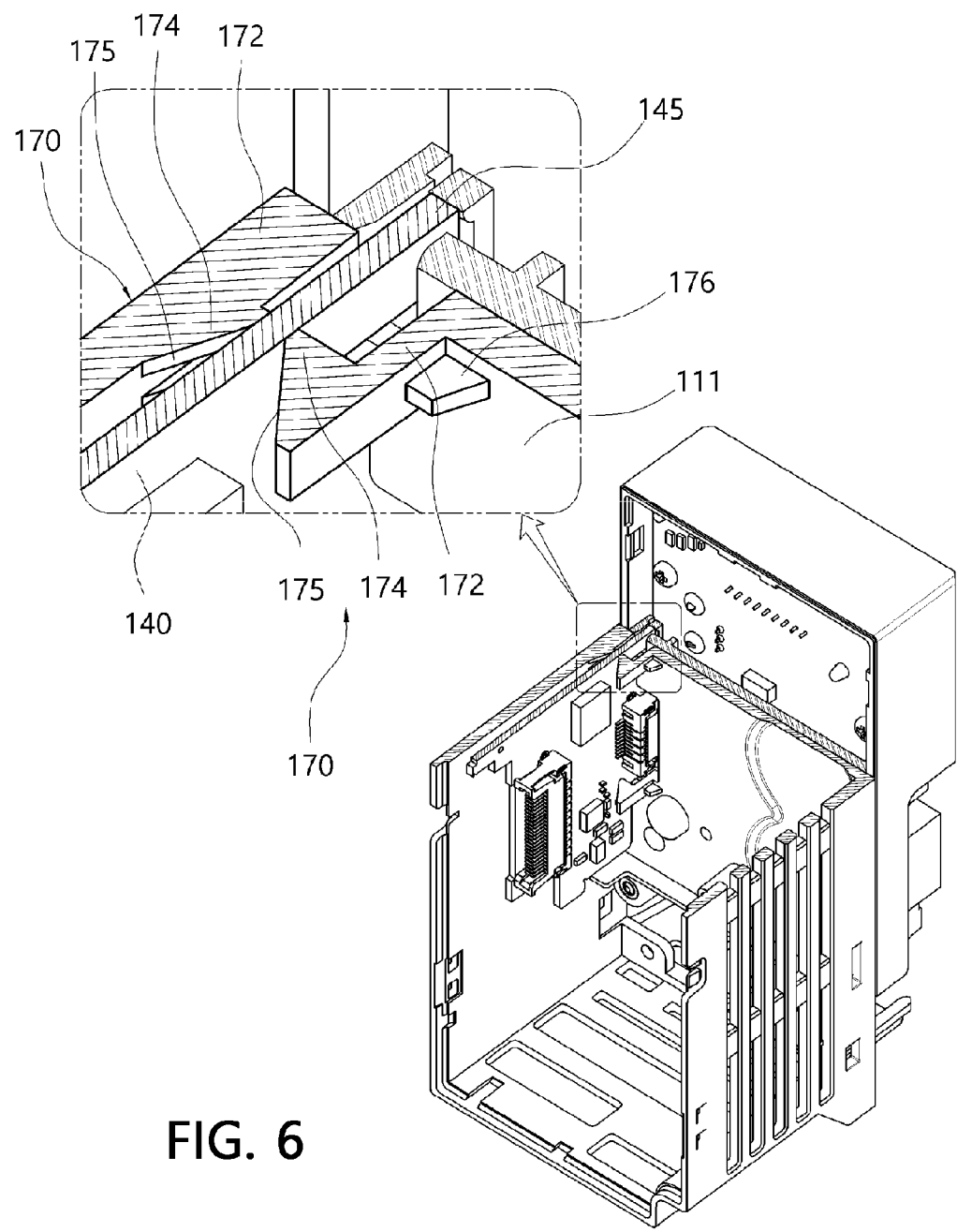
FIG. 6 is a view showing a state in which the second circuit board is coupled to the second fixing member of the electric motor drive device according to an exemplary embodiment of the present disclosure.

FIG. 5 is an enlarged view showing a second fixing member of the electric motor drive device according to an exemplary embodiment of the present disclosure. FIG. 6 is a view showing a state in which the second circuit board is coupled to the second fixing member of the electric motor drive device according to an exemplary embodiment of the present disclosure.

As illustrated in FIG. 5, the electric motor drive device 100 according to an exemplary embodiment of the present disclosure is provided with the second fixing member 170 such that the front side edge of the second circuit board 140 can be fixed to the second case 110.

As illustrated in FIG. 5, at least one second fixing member 170 is formed on the second surface 111 of the second case 110. Accordingly, a plurality of protrusions 145 may be formed at the front side edge of the second circuit board 140 to correspond to the number of the second fixing members 170.

In this case, as illustrated in FIG. 6, the second fixing member 170 is provided with a pair of second support ends 172 and a pair of second fixing protrusions 174, similar to the first fixing member 160, and a second guide surface 175 is formed on the second fixing protrusion 183. Accordingly, the descriptions of the second fixing member 170 that overlap with the first fixing member 160 will be omitted.

As illustrated in FIG. 6, a rib 176 may be formed at an end portion of the second support end 172 on the side of the second surface 111. The rib 176 may serve to support the second support end 172 so as not to be damaged even if the second support end 172 is elastically deformed. Accordingly, the durability of the second fixing member 170 is increased.

Figure 7:
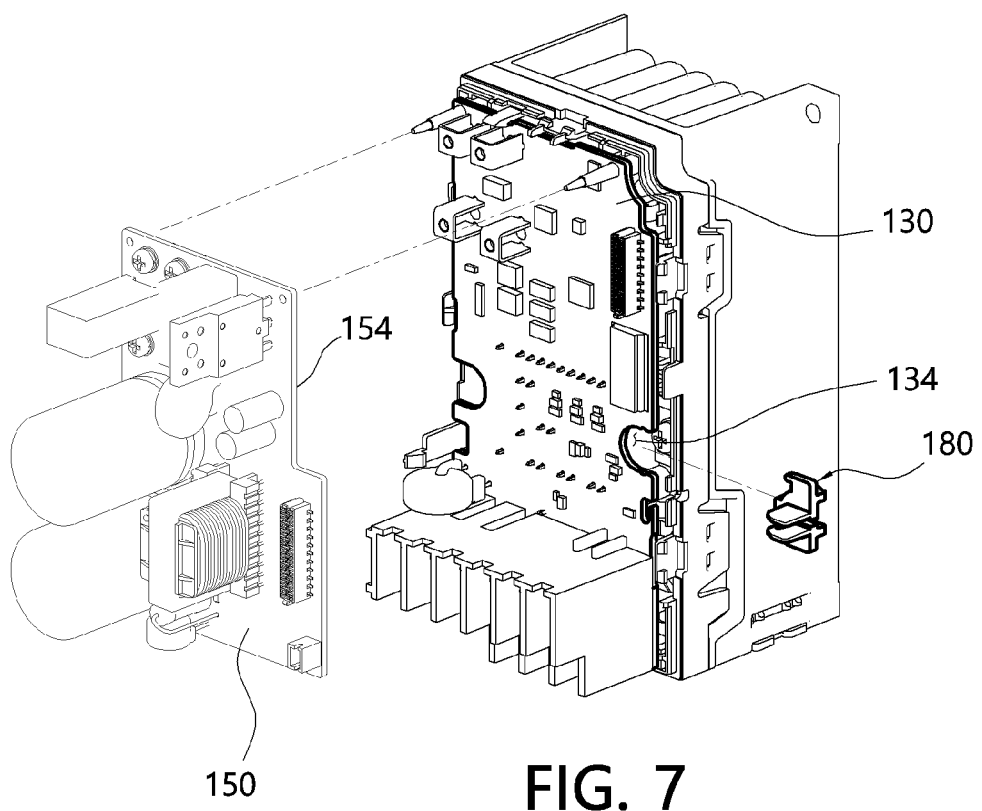
FIG. 7 is a view showing a state in which a support member of the electric motor drive device is separated according to an exemplary embodiment of the present disclosure.
Figure 8:
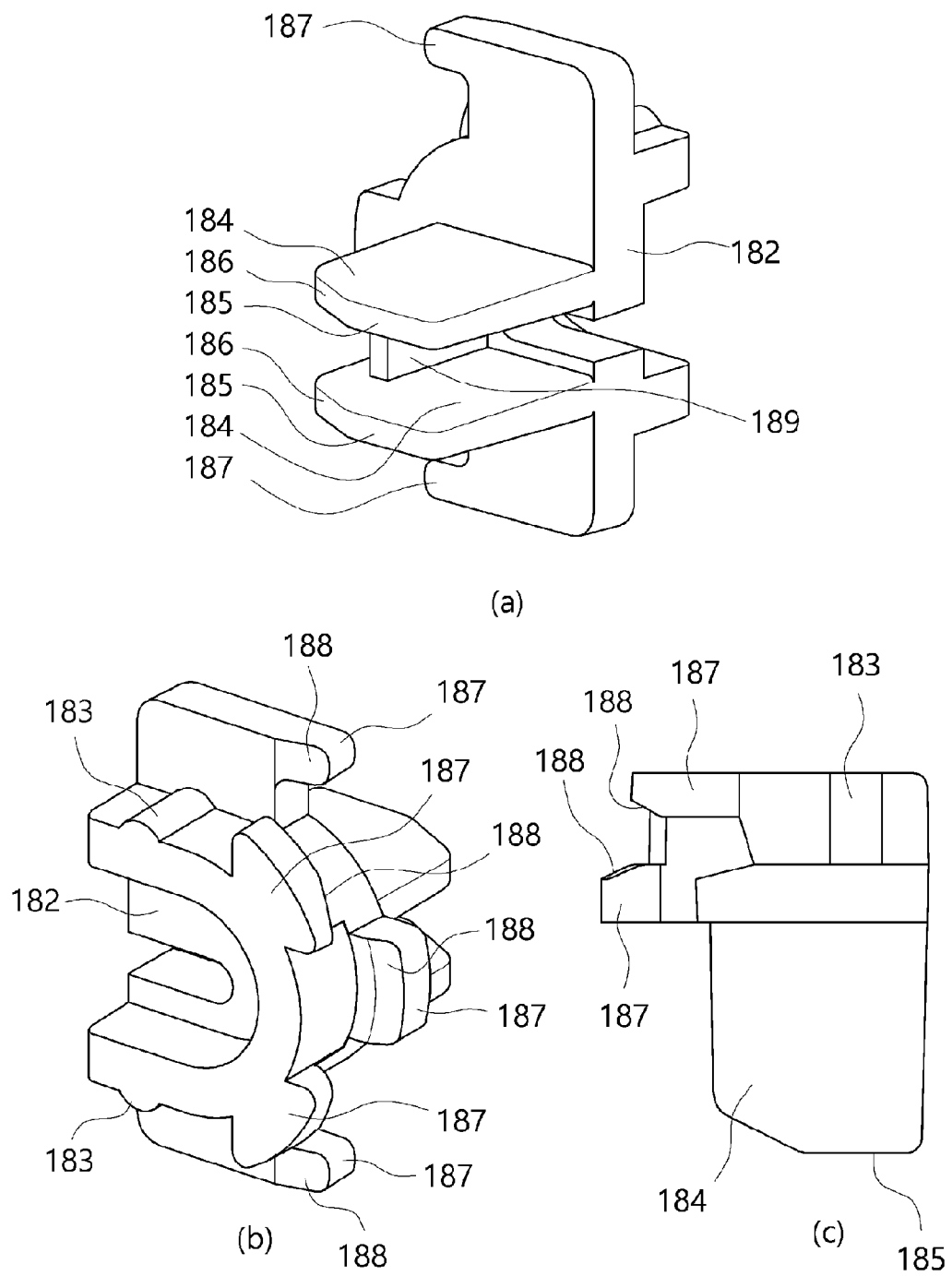
FIG. 8 (a) is a perspective view of a support member of the electric motor drive device according to an exemplary embodiment of the present disclosure viewed from one side.
Figure 9:
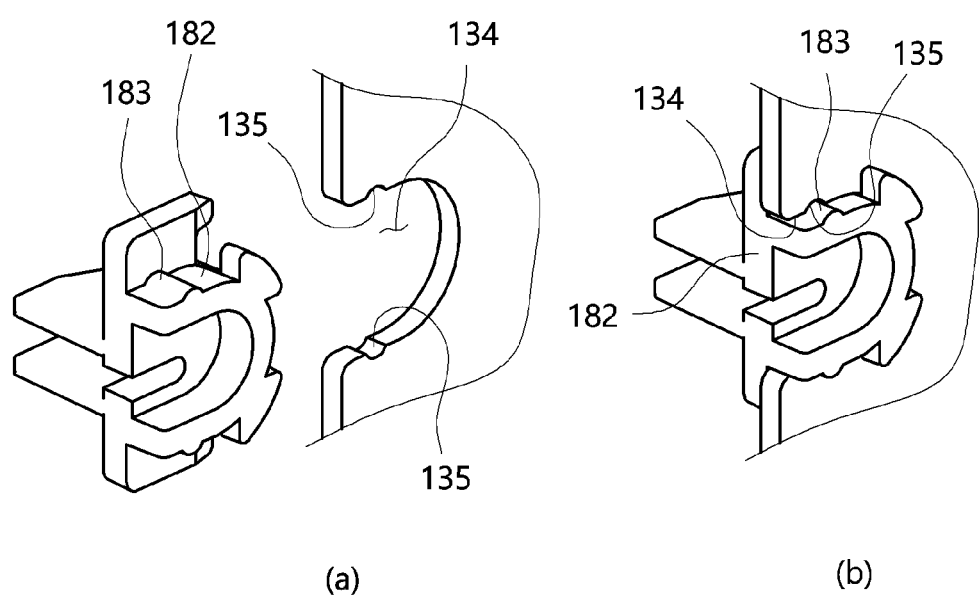
FIG. 9 (a) is an enlarged view showing a state in which the support member of the electric motor drive device is separated according to an exemplary embodiment of the present disclosure.

FIG. 7 is a view showing a state in which a support member of the electric motor drive device is separated according to an exemplary embodiment of the present disclosure. FIG. 8 (a) is a perspective view of a support member of the electric motor drive device according to an exemplary embodiment of the present disclosure viewed from one side. FIG. 8 (b) is a perspective view of the support member of the electric motor drive device according to an exemplary embodiment of the present disclosure viewed from the other side. FIG. 8 (c) is a side view of the support member of the electric motor drive device according to an exemplary embodiment of the present disclosure. FIG. 9 (a) is an enlarged view showing a state in which the support member of the electric motor drive device is separated according to an exemplary embodiment of the present disclosure. FIG. 9 (b) is an enlarged view showing a state in which the support member of the electric motor drive device according to an exemplary embodiment of the present disclosure is coupled to the first circuit board.

As illustrated in FIG. 7, the electric motor drive device 100 according to an exemplary embodiment of the present disclosure may be further provided with a support member 180.

The support member 180 supports the third circuit board 150 such that the third circuit board 150 can be disposed to be spaced apart from the first circuit board 130.

As illustrated in FIG. 7, the support member 180 is disposed at a position where a component that is capable of supporting the third circuit board 150 cannot be disposed structurally as other components are installed so as to support the third circuit board 150.

In this case, as for the support member 180, the third connector 152 may be disposed on one surface of the third circuit board 150, and the support member 180 may be disposed on the other side of the position corresponding thereto. That is, the third connector 152 and the support member 180 may be disposed to face each other with the third circuit board 150 in the middle.

As the support member 180 supports the third circuit board 150, the user may press the second circuit board 140 backward to firmly couple the fourth connector 144 to the third connector 152.

In this case, the support member 180 is coupled to the first circuit board 130 so as to support the third circuit board 150.

To this end, as illustrated in FIG. 8 (a), the first circuit board 130 of the electric motor drive device 100 according to an exemplary embodiment of the present disclosure is formed with a groove part 134 to which the support member 180 can be coupled, and the support member 180 is provided with a body 182, a support part 184 and a plurality of fixing parts 187.

As illustrated in FIG. 7, the shape of the groove part 134 may be a D-shape and may be formed to be concave toward the center of the first circuit board 130, but the shape of the groove part 134 is not limited.

The groove part 134 is formed at a position corresponding to the position of the third connector 152 of the third circuit board 150 such that the support member 180 is disposed on the rear surface of the third connector 152.

In this case, the body 182 is formed to extend in length, and the cross-section is formed to correspond to the shape of the groove part 134 formed in the first circuit board 130. Accordingly, the body 182 is seated and coupled to the groove part 134.

As illustrated in FIG. 8 (a), support part 184 is formed to protrude forward on the front surface of the body 182. The length at which the support part 184 protrudes forward may be formed differently depending on the length at which the first circuit board 130 and the third circuit board 150 must be spaced apart.

A plurality of support parts 184 may be formed as necessary. In this case, as illustrated in FIG. 8 (a), a partition wall 189 may be formed between the plurality of support parts 184. The partition wall 189 not only supports the third circuit board 150 firmly by increasing the rigidity of the support part 184, but also reduces the amount of material, which is economically feasible.

As illustrated in FIG. 8 (b), the fixing part 187 protrudes on a side surface of the body 182. A plurality of fixing parts 187 may be formed as necessary. The fixing part 187 supports the front surface and the rear surface of an edge portion of the groove part 134.

In this case, as illustrated in FIG. 8 (b), the fixing part 187 may be disposed to be symmetrical to the left and right sides of the body 182. In addition, two fixing parts 187 may be formed on the rear side, and three fixing parts 187 may be formed on the front side. In this case, the plurality of fixing parts 187 may be alternately disposed.

In particular, the fixing part 187 that is disposed on the front side may be formed to protrude left and right to stably support the third circuit board 150 in a state where the third connector 152 is coupled to the fourth connector 144. Accordingly, the contact area between the rear surface of the fixing part 187 and the front surface of the first circuit board 130 may be increased.

As illustrated in FIG. 8 (c), an inclined surface, that is, a guide surface 188, may be formed in the plurality of fixing parts 187 in a direction in which the support member 180 is coupled.

In order to guide the edge portion of the groove part 134 by the guide surface 188 such that the body 182 can be more easily coupled to the groove part 134, the guide surface 188 is formed with a front side fixing part 187 on the rear surface, and is formed with a rear side fixing part 187 on the front surface.

As illustrated in FIG. 8 (c), a support surface 185 which is capable of supporting the third circuit board 150 is formed in front of the support part 184. In this case, a support part guide surface 186 which is inclined in a direction in which the support part 184 is fitted and coupled to the groove part 134 may be formed in front of the support part 184.

When the support member 180 is replaced in a state where the first circuit board 130 and the third circuit board 150 disposed to be are spaced apart and fixed, the support guide surface 186 may guide the rear surface of the third circuit board 150 even if the rear surface of the third circuit board 150 is partially sagging such that the support member 180 can be coupled to the groove portion 134. Accordingly, the user may easily replace or couple the support member 180 without removing the third circuit board 150.

As illustrated in FIG. 9 (a), the support member 180 of the electric motor drive device 100 according to an exemplary embodiment of the present disclosure may further include a protrusion 183.

As illustrated in FIG. 9 (a), the protrusion 183 is formed on a side surface of the body 182. For example, it may be formed to protrude from the left and right side surfaces. In this case, there is no limit to the number or shape of the protruding protrusions 183.

Meanwhile, a seating groove 135 is formed on the inner circumferential surface of the groove part 134 to correspond to the position where the protrusion 183 of the body 182 is formed.

The number of seating grooves 135 is formed to correspond to the number of protrusions, and the shape of the seating grooves 135 corresponds to the shape of the protrusions 183 such that the protrusions can be seated in the seating groove.

Accordingly, as illustrated in FIG. 9 (b), in a state where the body 182 is coupled to the groove part 134, the protrusion 183 is seated and fixed in the seating groove 135, so as to prevent the body 182 from being separated from the groove part 134.

Figure 10:
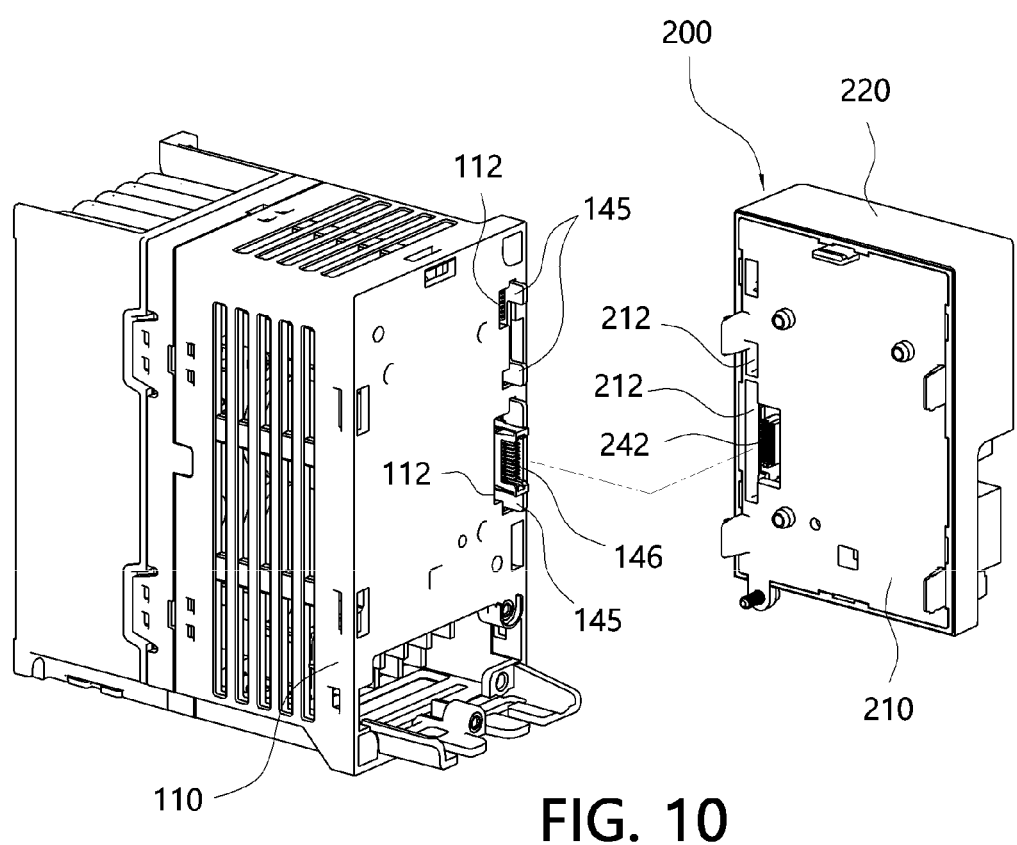
FIG. 10 is a view showing a state in which the operation module of the electric motor drive device is separated according to an exemplary embodiment of the present disclosure.
Figure 11:
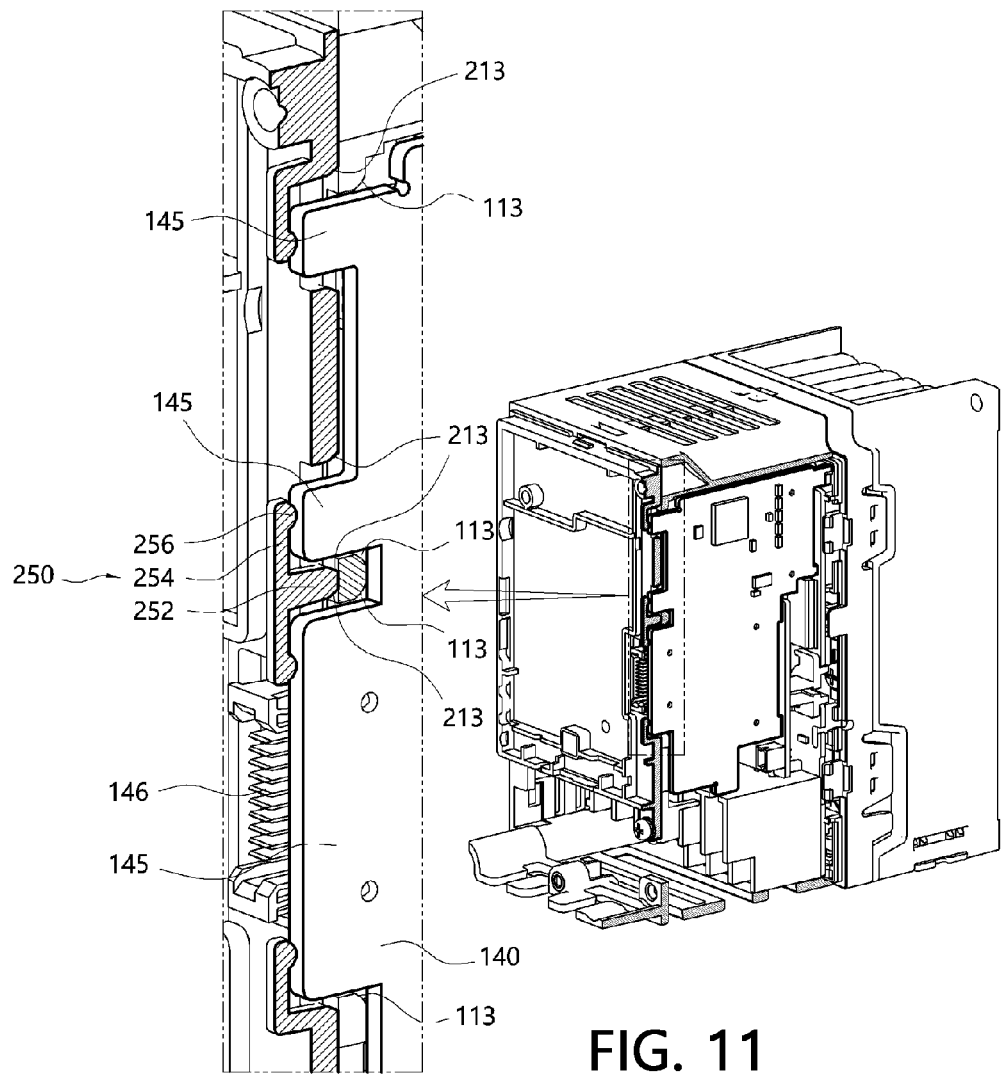
FIG. 11 is an enlarged view showing a pressing member of the electric motor drive device according to an exemplary embodiment of the present disclosure.
Figure 12:
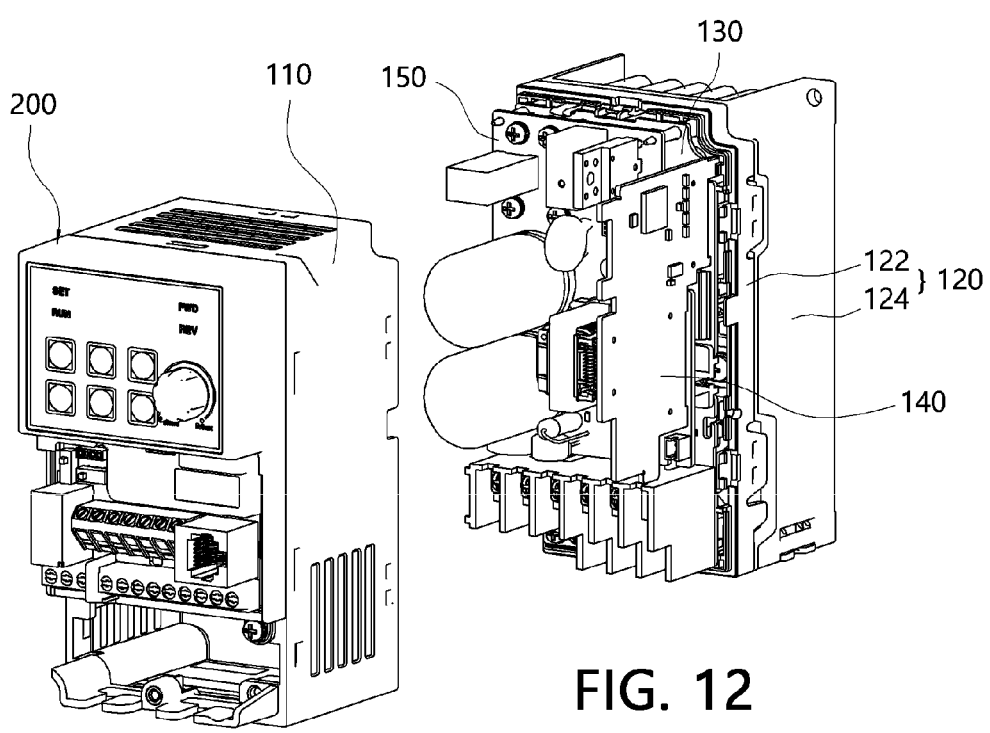
FIG. 12 is a view showing a state in which the first case of the electric motor drive device according to an exemplary embodiment of the present disclosure is separated.

FIG. 10 is a view showing a state in which the operation module of the electric motor drive device is separated according to an exemplary embodiment of the present disclosure. FIG. 11 is an enlarged view showing a pressing member of the electric motor drive device according to an exemplary embodiment of the present disclosure. FIG. 12 is a view showing a state in which the first case of the electric motor drive device according to an exemplary embodiment of the present disclosure is separated.

As illustrated in FIG. 10, the electric motor drive device according to an exemplary embodiment of the present disclosure is provided with an operation module 200 to control the electric motor drive device 100. The operation module 200 is coupled to the front side of the second case 110 such that the user can control the electric motor drive device 100.

In this case, the operation module 200 according to an exemplary embodiment of the present disclosure may include a housing 210, a cover 220, a fourth circuit board 240 and an operation unit 230.

The housing 210 is coupled to the front side of the second case 110. As illustrated in FIG. 10, the housing 210 is detachably coupled to the front surface of the second case 110, but there is no limitation in the structure to be coupled.

The cover 220 is disposed on the front side of the housing 210 to form a space therein. The cover 220 may cover all or part of the housing.

The operation unit 230 is disposed on the front side of the cover 220 such that the user can operate the electric motor drive device 100. The operation unit 230 may include a button unit, a display unit and the like.

The fourth circuit board 240 is disposed in the inner space formed by the cover 220 and the housing 210. The fourth circuit board 240 is connected to the second circuit board 140 such that the user can transmit an electrical signal to the electric motor drive device 100 through the operation unit 230.

In this case, in order for the fourth circuit board 240 to be connected to the second circuit board 140, a fifth connector 146 is provided on the second circuit board 140 of the electric motor drive device 100 according to an exemplary embodiment of the present disclosure, and a sixth connector 242 is provided on the fourth circuit board 240.

The fifth connector 146 is disposed at an edge opposite to the edge on which the second connector 142 and the fourth connector 144 are disposed.

In this case, a plurality of first through-holes 112 are formed on the front surface of the second case 110 such that the fifth connector 146 can be connected to the fourth circuit board 240 without using a separate wire or cable. The fifth connector 146 is disposed outside the second case 110 through any one of the plurality of first through-holes 112.

In this case, as illustrated in FIG. 11, a plurality of protrusions 145 may be formed on the front side of the second circuit board 140 such that the fifth connector 146 is disposed outside, and the fifth connector 146 may be disposed on any one protrusion 145 among the plurality of protrusions 145.

The plurality of protrusions 145 penetrate the plurality of first through-holes 112 formed in the second case 110. In this case, the first through-hole 112 is formed as an elongated hole, and at both ends, first through-hole guide surfaces 113 are formed such that the protrusions 145 can be guided to pass through the first through-holes 112.

Accordingly, the user can easily allow the protrusion 145 to penetrate the first through-hole 112 along the first through-hole guide surface 113 even if there is some error.

As illustrated in FIG. 12, in the assembly process of the electric motor drive device 100 according to an exemplary embodiment of the present disclosure, it may be assembled into a completed electric motor drive device 100, in a state where the operation module 200 is coupled to the second case 110, and the first circuit board 130, the second circuit board 140 and the third circuit board 150 are coupled to the first case 120.

In this case, as the first through-hole guide surface 113 is formed, even if some error occurs, it is possible to easily couple without a bad coupling or bad contact of the connectors.

Meanwhile, the fifth connector 146 is electrically coupled to the sixth connector 242 of the fourth circuit board 240. To this end, a second through-hole 212 is formed in the housing 210 at a position corresponding to the first through-hole 112.

As illustrated in FIG. 11, the shape or number of the second through-holes 212 is formed to correspond to the first through-holes 112, but there is no limitation on the shape or number as long as the plurality of protrusions 145 pass through the first through hole 112 and then pass through the second through hole 212 to be disposed in the inner space formed by the housing 210 and the cover 220

A second through-hole guide surface 213 may be formed in the second through-hole 212 similar to the first through-hole 112. However, the detailed description thereof will be omitted because it overlaps with the first through-hole guide surface 113.

In this case, as the protrusion 145 is disposed in the above-described inner space, the fifth connector 146 is also disposed in the inner space. The sixth connector 242 is disposed on the rear surface of the fourth circuit board 240 and is coupled to the fifth connector 146 that is inserted into the inner space of the housing 210.

Meanwhile, as illustrated in FIG. 11, the operation module 200 of the electric motor drive device 100 according to an exemplary embodiment of the present disclosure may be further provided with a pressing member 250.

The pressing member 250 may press the second circuit board 140 to the rear side such that the second connector 142 and the fourth connector 144 are firmly coupled to the first connector 132 and the third connector 152. To this end, as illustrated in FIG. 11, the pressing member 250 may be disposed to face the second connector or the fourth connector with the second circuit board interposed therebetween.

In this case, as illustrated in FIG. 11, the pressing member 250 of the electric motor drive device 100 according to an exemplary embodiment of the present disclosure may be provided with a support 252, an elastic band 254 and a pressing protrusion 256.

The support 252 is formed to protrude from the front surface of the housing toward the inner space. In this case, the length protruding from the front surface of the housing is formed to be longer than the length in which the protrusion 145 of the second circuit board 140 penetrates the second through-hole 212 and is inserted into the inner space of the operation module 200.

In this case, as illustrated in FIG. 11, one or two elastic bands 254 are protruded from a side surface of the front end of the support 252. In this case, a pressing protrusion 256 is formed to protrude from a rear surface of the front end of the elastic band 254.

The elastic band 254 is formed to protrude toward the second through-hole 212 such that the pressing protrusion 256 can press the front surface of the protrusion 145.

Accordingly, it is possible to elastically press the front surface of the protrusion 145 through the pressing protrusion 256.

By providing the pressing member 250, the second circuit board 140 may be more firmly disposed inside the second case 110 in a direction perpendicular to the first surface 125 without additional screws.

Although the electric motor drive device according to various exemplary embodiments of the present disclosure has been described above, those skilled in the art will be able to clearly understand that the coupling structure of the electric motor drive device according to the present exemplary embodiment is not applicable only to the electric motor drive device, but also when at least two thereof are disposed on a circuit board inside the housing, they can be used as a device structure that can be easily assembled.

As described above, preferred exemplary embodiments according to the present disclosure have been described, and the fact that the present disclosure can be embodied in other specific forms without departing from the spirit or scope of the present disclosure in addition to the above-described exemplary embodiments is apparent to those skilled in the art. Therefore, the above-described exemplary embodiments are to be regarded as illustrative rather than restrictive, and accordingly, the present disclosure is not limited to the above description, but may be modified within the scope of the appended claims and their equivalents.

The invention claimed is:

1. An electric motor drive device, to which an operation module is connected, comprising:
   a first case having a first surface formed therein;
   a second case having an inner accommodation space formed therein and having an outer portion to which the operation module is coupled;
   a first circuit board disposed on the first surface and having a first connector at one side thereof;
   a second circuit board disposed within the second case and having a second connector; and
   a first fixing member formed to protrude from the first surface such that one side of the second circuit board is fitted and coupled thereto in a perpendicular state to the first circuit board,
   wherein the first fixing member comprises:
      a pair of first support ends that protrude from the first surface and are disposed to be spaced apart from each other at a predetermined interval; and
      a pair of first fixing protrusions that respectively protrude from inner ends of the pair of first support ends, and
   wherein one side of the second circuit board is elastically supported by the pair of first support ends in a state of being fitted and coupled between the pair of first fixing protrusions.

2. The electric motor drive device of claim 1, wherein a first guide surface is formed on the pair of first fixing protrusions to guide one side of the second circuit board between the pair of first fixing protrusions.

3. The electric motor drive device of claim 1, further comprising:
   at least one second fixing member which is formed to protrude from a second surface that is formed to face the first surface inside the second case such that the other side of the second circuit board is fitted and coupled thereto,
   wherein the second fixing member comprises a pair of second support ends that protrude from the second surface and are disposed to be spaced apart from each other at a predetermined interval; and a pair of second fixing protrusions that respectively protrude from inner ends of the pair of second support ends, and wherein the other side of the second circuit board is elastically supported by the pair of second support ends in a state of being fitted and coupled between the pair of second fixing protrusions.

4. The electric motor drive device of claim 3, wherein a second guide surface is formed on the pair of second fixing protrusions to guide the other side of the second circuit board between the pair of second fixing protrusions.

5. The electric motor drive device of claim 1, further comprising:

a third circuit board which is disposed to be spaced apart from the first circuit board at a predetermined interval and is provided with a third connector on one side thereof, wherein the second circuit board is further provided with a fourth connector that is electrically connected to the third connector, wherein the first connector, the second connector, the third connector and the fourth connector are formed to be coupled by pressing in a direction perpendicular to the first surface, and wherein the electric motor drive device further comprises a support member which is disposed to face the third connector with the third circuit board interposed therebetween to support the third circuit board when the fourth connector is coupled to the third connector.

6. The electric motor drive device of claim 5, wherein the first circuit board is provided with a groove part which is formed at a position corresponding to a position of the third connector on the third circuit board, and wherein the support member comprises a body which is fitted and coupled to the groove part; at least one support part which protrudes from one surface of the body such that a front end surface thereof supports the third circuit board; and a plurality of fixing parts which protrude from a side surface of the body so as to support both surfaces of an edge portion of the groove part.

7. The electric motor drive device of claim 6, wherein the support member further comprises a plurality of protrusions that are formed to protrude from a side surface of the body, and wherein a plurality of seating grooves in which the plurality of protrusions are seated are formed on the inner circumferential surface of the groove part so as to prevent the body from being separated from the groove part.

8. The electric motor drive device of claim 6, wherein a support guide surface is formed on the plurality of fixing parts so as to guide the edge portion between the plurality of fixing parts.

9. The electric motor drive device of claim 1 or 5, wherein the second circuit board comprises a plurality of protrusions that are formed to protrude from the other side; and a fifth connector which is disposed on any one of the plurality of protrusions, wherein the second case is provided with a plurality of first through-holes which are formed to extend on an inner surface of the second case facing the first surface such that the plurality of protrusions pass through the second case and are disposed outside the second case, and wherein the operation module comprises a housing which is coupled to a lower surface of the first surface and is provided with a plurality of second through-holes that are formed at positions corresponding to the plurality of first through-holes; a cover which is coupled to the housing to form an inner space; a fourth circuit board which is disposed in the inner space; and a sixth connector which is provided on one side of the fourth circuit board and electrically coupled to the fifth connector as the housing is coupled to the second case.

10. The electric motor drive device of claim 9, wherein first through-hole guide surfaces are formed at both ends of the through-hole in the longitudinal direction such that the protrusion is guided to the through-hole.

11. The electric motor drive device of claim 9, further comprising:

at least one pressing member which elastically presses a front end surface of the protrusion such that the second circuit board is pressed toward the first surface.

12. The electric motor drive device of claim 11, wherein the pressing member is disposed to face the second connector or the fourth connector with the second circuit board interposed therebetween.

13. The electric motor drive device of claim 11, wherein the pressing member comprises a support which protrudes from the housing toward the inner space; an elastic band which protrudes from a side surface of the support toward the second through-hole; and a pressing protrusion which presses the front end surface of the protrusion from the elastic band.

* * * * *